(12) United States Patent
Guo et al.

(10) Patent No.: US 9,898,943 B2
(45) Date of Patent: Feb. 20, 2018

(54) LIQUID CRYSTAL DISPLAY MODULE

(71) Applicant: Wuhan China Star Optoelectronics Technology Co., Ltd., Wuhan, Hubei (CN)

(72) Inventors: Xingling Guo, Guangdong (CN); Jiehui Qin, Guangdong (CN); Xiaoping Tan, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 245 days.

(21) Appl. No.: 14/906,548

(22) PCT Filed: Dec. 30, 2015

(86) PCT No.: PCT/CN2015/099647
§ 371 (c)(1),
(2) Date: Jan. 20, 2016

(87) PCT Pub. No.: WO2017/092135
PCT Pub. Date: Jun. 8, 2017

(65) Prior Publication Data
US 2017/0263165 A1    Sep. 14, 2017

(51) Int. Cl.
*G02F 1/1345* (2006.01)
*G09G 3/00* (2006.01)
*G09G 3/36* (2006.01)
*G02F 1/13* (2006.01)

(52) U.S. Cl.
CPC .......... *G09G 3/006* (2013.01); *G02F 1/1309* (2013.01); *G02F 1/13452* (2013.01); *G09G 3/3648* (2013.01); *G09G 2330/12* (2013.01)

(58) Field of Classification Search
CPC .................................................. G02F 1/13452
See application file for complete search history.

(56) References Cited

U.S. PATENT DOCUMENTS 6,667,542 B2 * 12/2003 Yamaguchi ............. H01L 24/81
257/668
2012/0161805 A1 * 6/2012 Jung ...................... G09G 3/006
324/754.07

* cited by examiner

*Primary Examiner* — Phu Vu
(74) *Attorney, Agent, or Firm* — Andrew C. Cheng

(57) ABSTRACT

The present disclosure provides a liquid crystal display module, which includes a liquid crystal display panel and a driver integrated circuit, wherein the liquid crystal display panel includes a testing pad, a first pad and a second pad, the first pad includes a first sub pad and a second sub pad which are separately disposed, the second sub pad is electrically connected to the testing pad, the driver integrated circuit includes at least two third pads, the third pads are respectively bonded to the first pad and the second pad; the first sub pad and the second sub pad are commonly bonded to one of the third pads, so as to achieve a short circuit between the first sub pad and the second sub pad. In the liquid crystal display module of the present disclosure, the space occupied by the bonding area is small.

9 Claims, 2 Drawing Sheets

LIQUID CRYSTAL DISPLAY MODULE

CROSS-REFERENCE TO RELATED APPLICATIONS

This application claims the benefit of, and priority to, Chinese Patent Application No. 201510872266.X, filed Dec. 1, 2015, titled "liquid crystal display module", the entire contents of which are incorporated by reference herein in its entirety.

FIELD OF THE INVENTION

The disclosure is related to liquid crystal display technology field, and more particular to a liquid crystal display module.

BACKGROUND OF THE INVENTION

In the design and manufacturing process of the liquid crystal display panel, when designing the signal trace of the panel, besides some basic signal lines (such as a gate signal line and a data signal line) necessarily configured necessary for the product function thereof (normal display), the designer may further retain some other signal lines which detect whether the product performance is completed. Usually, before the liquid crystal display panel is bonded with the flexible printed circuit (FPC) board or driver IC, these signal lines may be connected to the cell test pad, it is convenient to the tester uses the oscilloscope to detect the electric signal state of the signal lines, so as to analyze the working state of the circuit inside the liquid crystal cell. During the latter production perion, these signal circuits are connected by the circuits, and a particular voltage level is inputted, such that some unnecessary circuits (not used when design testing and module producing) inside the cell of the liquid crystal panel are shorted or opened.

In order to achieve the unnecessary circuits to short or open, the trace of the circuit on the array substrate needing to be tested is usually connected to the cell test pad through the expert, which is used for the tester to detect. On the other side of the test pad, the trace is designed to connect to the bonding pin of the driver IC or the flexible printed circuit board. When bonding the driver IC or the flexible printed circuit board, a circuit trace is designed on the flexible printed circuit board, it is used to connect to the pad of the required voltage level and the pad of the cell test pad, such that this voltage level is transmitted to the cell of the liquid crystal panel again through the cell test pad, thereby shorting or opening some unnecessary circuits. The above scheme means that the potential of the driver IC or the flexible printed circuit board bonded on the pad is led back to the thin film transistor array substrate by using the circuit trace on the flexible printed circuit board served as a bridging. Although it is possible to achieve its necessary functions, the disadvantage thereof is that is needs more pads, it does not decrease the number of the pad when bonding the driver IC or the flexible printed circuit board, it does not reduce the area of the flexible printed circuit board or reduce the size of the driver IC, and it can bond the driver IC by necessarily using the flexible printed circuit board, such that this process does not obtain more benefits.

SUMMARY OF THE INVENTION

A technical problem to be solved by the present disclosure provides a liquid crystal display module in which a space occupied by a binding region is small.

In order to achieve the above purpose, the embodiment of the present disclosure provides the following technical schemes:

The present disclosure provides liquid crystal display module, which includes a liquid crystal display panel and a driver integrated circuit, wherein the liquid crystal display panel comprises a testing pad, a first pad and a second pad, the first pad comprises a first sub pad and a second sub pad which are separately disposed, the second sub pad is electrically connected to the testing pad, the driver integrated circuit comprises at least two third pads, the third pads are respectively bonded to the first pad and the second pad; the first sub pad and the second sub pad are commonly bonded to one of the third pads, so as to achieve a short circuit between the first sub pad and the second pad.

In one embodiment, the liquid crystal display panel includes a plurality of liquid crystal cells, the testing pad is electrically connected to the liquid crystal cells through a first testing signal line, and the first pad and the second pad are electrically connected to the liquid crystal cells through a display signal line.

In one embodiment, the second sub pad is electrically connected to the testing pad through a second testing signal line.

In one embodiment, a sum of a welding area of the first sub pad and a welding area of the second sub pad is less than a welding area of the second pad.

In one embodiment, the first pad and the second pad are arranged on a first direction, and a length of the first sub pad and the second sub pad on the first direction is less than or equals to a length of the second pad in the first direction.

In one embodiment, the first sub pad and the second sub pad are disposed in parallel in the first direction.

In one embodiment, in a second direction perpendicular to the first direction, a length of the first sub pad is D1, a length of the second sub pad is D2, a distance between the first sub pad and the second sub pad is d, a length of the second pad is D, the D1, the D2 the d and the D satisfies: D1+d+D2≤D.

In one embodiment, the D1 and the D2 satisfies: D1=D2.

In one embodiment, the D and the d satisfy: ¼D≤d≤½D.

In one embodiment, an anisotropic conductive film is disposed between the first pad and the third pad and between the second pad and the third pad The present disclosure has the following advantage or beneficial efficiency.

The liquid crystal display module of the embodiment cleverly uses the third pad on the driver integrated circuit to achieve the short of the first sub pad and the second sub pad on the liquid crystal display panel, such that the first sub pad and the second sub pad have the same voltage level. The prior art uses one short line bonded on the flexible printed circuit board to connect to the pad of the first voltage level and the testing pad, thus this scheme needs disposing one additional circuit line and an additional pair of bonding pads, thereby increasing the space occupied by the bonding area. Therefore, the liquid crystal display module of the embodiment with respect to the prior art, a required number of pads for bonding is less, and the required space occupied by the bonding area is also smaller. Thus the volume of the driver integrated circuit may be decreased, such as the volume of bonding to the flexible printed circuit board or the driver IC of liquid crystal display panel, it advantages the development of the volume miniaturization of the liquid crystal display module.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according to the drawings described below without creative endeavor.

DETAILED DESCRIPTION

Below in conjunction with the accompanying drawings, the present disclosure will be described in detail by specific embodiments, the present disclosure will make technical and other benefits are obvious.

Figure 1:
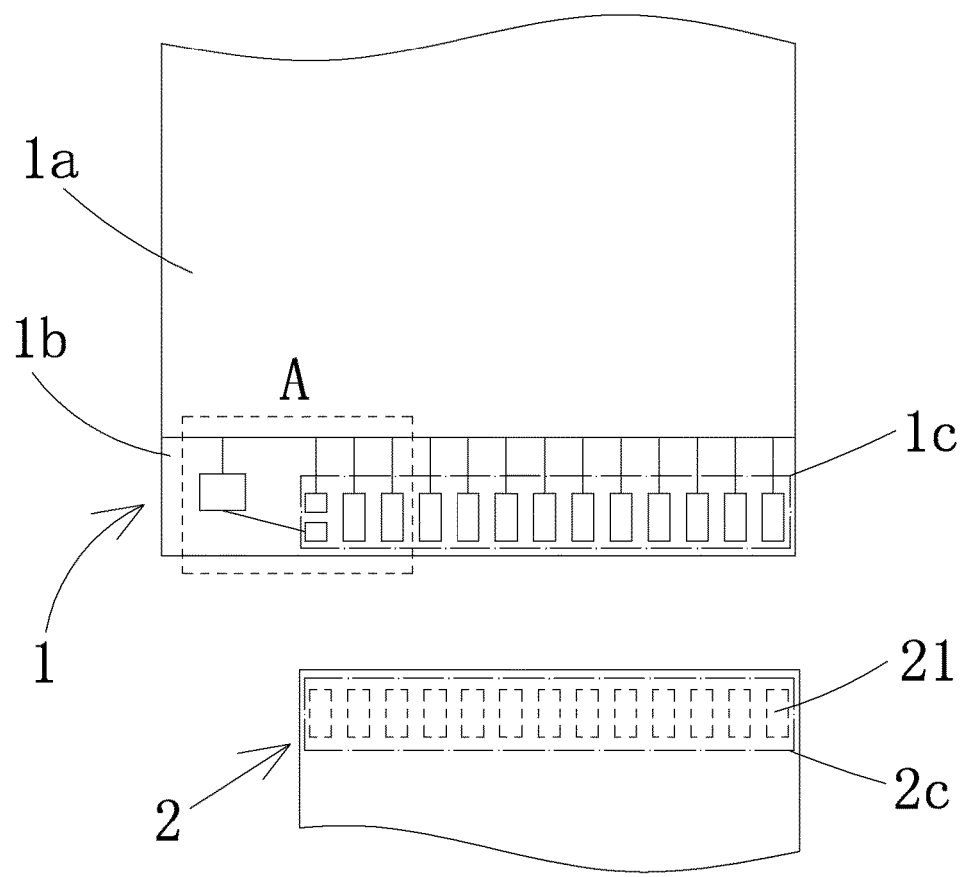
FIG. 1 is a structure schematic view of a liquid crystal display module before bonding according to an embodiment of the present disclosure.
Figure 2:
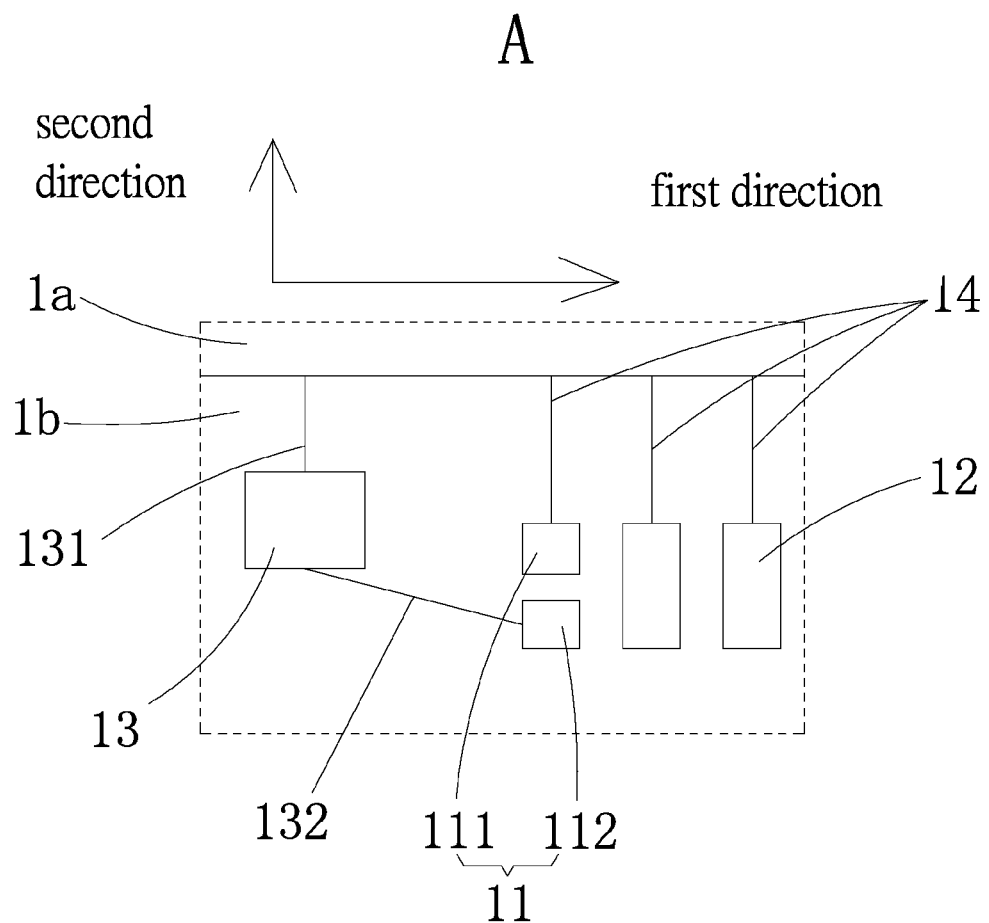
FIG. 2 is an enlarged schematic diagram of a structure at A of FIG. 1.
Figure 3:
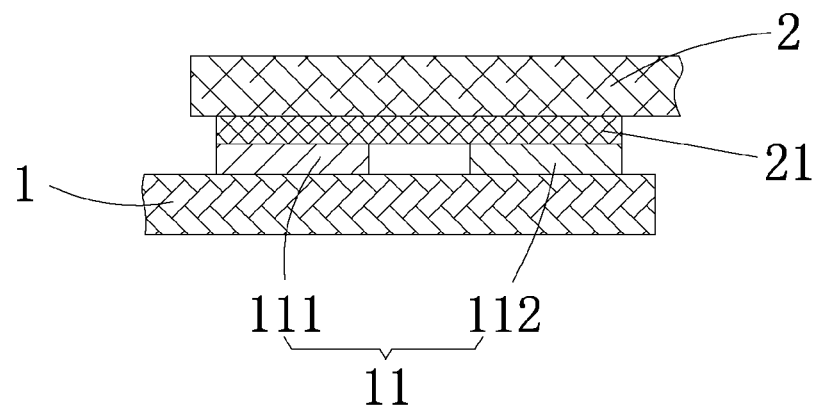
FIG. 3 is a part structure schematic view of a liquid crystal display module after bonding according to an embodiment of the present disclosure.

Please refers to FIG. 1 to FIG. 3, the present disclosure provides a liquid crystal display panel 1 and a driver integrated circuit 2. The liquid crystal display panel 1 includes a display area 1a and a non-display area 1b disposed surrounding the display area 1a. An interior of the non-display area 1b is disposed with a first bonding area 1c and a testing pad 13. The testing pad 13 is connected to a liquid crystal cell (not shown) inside the display area 1a through a first testing signal line 131, and a oscilloscope may be connected to the testing pad 13 by a tester, thereby analyzing a working state of the circuit inside the liquid crystal panel by detecting an electrical signal state of the liquid crystal cell. The first bonding area 1c includes a first sub pad 111 and a plurality of second sub pads 112 which are separately disposed, the first sub pad 111 and the second sub pads 112 are electrically connected to the liquid cell through display signal lines 14, and the second sub pad 112 is electrically connected to the testing pad 13 through a second testing signal line 132. In the embodiment, since the first sub pad 111 and the second sub pads 112 are separately disposed, i.e. both of them are independent each other, when the first sub pad 111 is electrically connected to the liquid crystal cell through the display signal line 14, and the second sub pad 112 is electrically connected to the liquid crystal cell through the first testing signal line 131 after the second sub pad 112 is electrically connected to the testing pad 13, the display signal line 14 and the first testing signal line 13 do not interfere with each other, thus the tester is capable of successfully complete a test of a internal circuit state inside the liquid crystal display panel 1 before bonding the liquid crystal display panel 1 to the driver integrated circuit 2. In the embodiment, the first sub pad 111 may be electrically connected to the testing pad 13 through the second testing signal line 132, and it may also be electrically connected to the testing pad 13 through other connecting manner.

Please refers to FIG. 1 to FIG. 3, in the embodiment, the driver integrated circuit 2 includes a second bonding area 21, the second bonding area 21 includes a plurality of third pads 21 which are separately disposed, and the third pads 21 are respectively bonded to the first pad 11 and the second pad 12. The first sub pad 111 and the second sub pad 112 are commonly bonded to one of the third pads 21, so as to achieve a short circuit between the first sub pad 111 and the second sub pad 112. Therefore, the first sub pad 111 and the second sub pad 112 have the same voltage level due to they are shorted by the third pad 21. In the embodiment, the liquid crystal display module, the first pad 11 is designed at a bonding position corresponding to the third pad 21 with a first voltage level, and the plurality of the second pads 12 are disposed at bonding positions corresponding to the other third pads 21. After the driver integrated circuit 2 is bonded to the liquid crystal display panel 1, the first sub pad 111 and the second sub pad 112 have the first voltage level, and the first sub pad 111 transmits the first voltage level to the liquid crystal cell through the display signal line 14, so as to participate in the display of the display area 1a, and the second sub pad 112 transmits the first voltage level to the testing pad 13 and then the first voltage level is transmitted to the liquid crystal cell through the second testing signal line 132, such that the testing circuit inside the liquid crystal display panel is shorted or opened, thus it does not affect the normal display of the display area.

It should be understood that the liquid crystal display module of the embodiment cleverly uses the third pad 21 on the driver integrated circuit 2 to achieve the short of the first sub pad 111 and the second sub pad 112 on the liquid crystal display panel 1, such that the first sub pad 111 and the second sub pad 112 have the same voltage level. The prior art uses one short line bonded on the flexible printed circuit board to connect to the pad of the first voltage level and the testing pad, thus this scheme needs disposing one additional circuit line and an additional pair of bonding pads, thereby increasing the space occupied by the bonding area. Therefore, the liquid crystal display module of the embodiment with respect to the prior art, a required number of pads for bonding is less, and the required space occupied by the bonding area is also smaller. Thus the volume of the driver integrated circuit 2 may be decreased, such as the volume of bonding to the flexible printed circuit board or the driver IC of liquid crystal display panel 1, it advantages the development of the volume miniaturization of the liquid crystal display module.

It should be understood that "the first pad" is not limited to it must be a single pad, so as to explain that the combination of the first sub pad 111 and the second sub pad 112 is similar to the second pad (for example, they occupy the almost bonding space and are bonded to one third pad) and separated from the second pad. "The non-display area 1b" is positioned at, but not limited to, a side of the display area 1a. "The first voltage level" is not limited to a certain voltage level, as long as it is realized that the voltage level for shorting or opening the testing circuit inside the liquid crystal were within the scope of the present disclosure.

Further, please refers to FIG. 1 and FIG. 2, a sum of a welding area of the first sub pad 111 and a welding area of the second sub pad 112 is less than a welding area of the second pad.

Further, an arranged direction of the first pad 111 and the plurality of the second pads 12 is defined as a first direction, and the second pads 12 extend in a second direction. A length of the first sub pad 111 and the second sub pad 112 in the first direction is less than or equals to a length of the second pad 112 in the first direction, preferably, the length of the first sub pad 111 and the second sub pad 112 in the first direction equals to a length of the second pad 112 in the first direction. The first sub pad 111 and the second sub pad 112 are aligned in center in the second direction. In the embodiment, the first pad 11 may be successfully bonded to the third pad 13.

Further, a length of the first sub pad 111 in the second direction is D1, a length of the second sub pad 112 in the second direction is D2, and a distance between the first sub pad 111 and the second sub pad 112 in the second direction is d. A length of the second pad 12 in the second direction is D. In the embodiment, a position relationship of the first sub pad 111 and the second sub pad 112 satisfies: D1+d+D2≤D, preferably, D1+d+D2=D. In the embodiment, the first pad 11 may be successfully bonded to the third pad 13.

Further, the length D1 of the first sub pad 111 and the length D2 of the second sub pad 112 satisfy: D1=D2, such that the craftsmanship of the liquid crystal display panel 1 is easier.

Further, the distance between the first sub pad 111 and the second sub pad 112 in the second direction is d, which satisfies: ¼D≤d≤½D, so as to ensure that the first sub pad 111 and the second pad 112 are independent to each other and do not interfere to each other.

Further, a conductive film is disposed between the first pad and the third pad and between the second pad and the third pad to achieve the connection. Preferably, the conductive film is an anisotropic conductive film (ACF).

The above embodiments do not constitute a limitation of protection scope of the technical solution. Any modifications equivalent replacement and improvement made within the spirit and principle of the above embodiments should be included within the protection scope of the technical solution.

What is claimed is:

1. A liquid crystal display module, comprising a liquid crystal display panel and a driver integrated circuit, wherein the liquid crystal display panel comprises a testing pad, a first pad and a second pad, the first pad comprises a first sub pad and a second sub pad which are separately disposed, the second sub pad is electrically connected to the testing pad, the driver integrated circuit comprises at least two third pads, the third pads are respectively bonded to the first pad and the second pad; the first sub pad and the second sub pad are commonly bonded to one of the third pads, so as to achieve a short circuit between the first sub pad and the second sub pad; and wherein the liquid crystal display panel comprises a plurality of liquid crystal cells, the testing pad is electrically connected to the liquid crystal cells through a first testing signal line, and the first pad and the second pad are electrically connected to the liquid crystal cells through a display signal line.

2. The liquid crystal display module according to claim 1, wherein the second sub pad is electrically connected to the testing pad through a second testing signal line.

3. The liquid crystal display module according to claim 1, wherein a sum of a welding area of the first sub pad and a welding area of the second sub pad is less than a welding area of the second pad.

4. The liquid crystal display module according to claim 3, wherein the first pad and the second pad are arranged in a first direction, and a length of the first sub pad and the second sub pad on the first direction is less than or equals to a length of the second pad on the first direction.

5. The liquid crystal display module according to claim 4, wherein the first sub pad and the second sub pad are disposed in parallel in the first direction.

6. The liquid crystal display module according to claim 5, wherein in a second direction perpendicular to the first direction, a length of the first sub pad is D1, a length of the second sub pad is D2, a distance between the first sub pad and the second sub pad is d, a length of the second pad is D, the D1, the D2 the d and the D satisfies: D1+d+D2≤D.

7. The liquid crystal display module according to claim 6, wherein the D1 and the D2 satisfy: D1=D2.

8. The liquid crystal display module according to claim 7, wherein the D and the d satisfy: ¼D≤d≤½D.

9. The liquid crystal display module according to claim 1, wherein an anisotropic conductive film is disposed between the first pad and the third pad and between the second pad and the third pad.

* * * * *